United States Patent
Fujino et al.

(10) Patent No.: US 11,884,818 B2
(45) Date of Patent: Jan. 30, 2024

(54) POLYAMIDE PRE-EXPANDED PARTICLES, AND POLYAMIDE FOAM MOLDED ARTICLE AND METHOD OF PRODUCING THE SAME

(71) Applicant: ASAHI KASEI KABUSHIKI KAISHA, Tokyo (JP)

(72) Inventors: Yoshinori Fujino, Tokyo (JP); Ryota Nakayama, Tokyo (JP); Yasuyuki Kawazu, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 537 days.

(21) Appl. No.: 17/266,612

(22) PCT Filed: Jul. 31, 2019

(86) PCT No.: PCT/JP2019/029988
§ 371 (c)(1),
(2) Date: Feb. 8, 2021

(87) PCT Pub. No.: WO2020/031803
PCT Pub. Date: Feb. 13, 2020

(65) Prior Publication Data
US 2021/0317308 A1 Oct. 14, 2021

(30) Foreign Application Priority Data

Aug. 8, 2018 (JP) .................. 2018-149651
Aug. 8, 2018 (JP) .................. 2018-149652

(51) Int. Cl.
*C08J 9/232* (2006.01)
*C08L 77/06* (2006.01)

(52) U.S. Cl.
CPC .............. *C08L 77/06* (2013.01); *C08J 9/232* (2013.01); *C08J 2201/034* (2013.01); *C08J 2377/06* (2013.01)

(58) Field of Classification Search
CPC ..... C08L 77/06; C08J 9/232; C08J 2201/034; C08J 2377/06; C08J 9/22; C08J 9/16; C08J 9/228; C08J 2377/00
See application file for complete search history.

(56) References Cited

U.S. PATENT DOCUMENTS

| | | |
|---|---|---|
| 2011/0294910 A1 | 12/2011 | Kriha et al. |
| 2016/0347915 A1 | 12/2016 | Oda et al. |
| 2017/0283555 A1 | 10/2017 | Takano et al. |
| 2018/0044497 A1 | 2/2018 | Kondo et al. |

FOREIGN PATENT DOCUMENTS

| | | |
|---|---|---|
| CN | 105940043 A | 9/2016 |
| JP | S61268737 A | 11/1986 |
| JP | H07137063 A | 5/1995 |
| JP | H07179645 A | 7/1995 |
| JP | 2011105879 A | 6/2011 |
| JP | 2016188342 A | 11/2016 |
| JP | 6068737 B1 | 1/2017 |
| JP | 2017066279 A | 4/2017 |
| JP | 2018043487 A | 3/2018 |
| JP | 2018043490 A | 3/2018 |
| JP | 2018044127 A | 3/2018 |
| JP | 2018144462 A | 9/2018 |
| JP | 2019001004 A | 1/2019 |
| WO | 2016052387 A1 | 4/2016 |
| WO | 2016147582 A1 | 9/2016 |

OTHER PUBLICATIONS

Feb. 9, 2021, International Preliminary Report on Patentability issued in the International Patent Application No. PCT/JP2019/029988.

Takeshi Takayanagi et al., Studies on the Properties of Nylon Plastics (Part 1) (Water Absorption and Dependency of Dielectric Properties on Water Content and the Degree of Crystallinity of Nylon Plastics), Journal of the Japan Society for Testing Materials, 1960, pp. 50-56, vol. 9, Issue 76, with a partial English translation.

Editorial Board of Encyclopedia for the Utilization of Plastic Materials, Encyclopedia for the Utilization of Plastic Materials, 2001, with a partial English translation.

Suzuki Professional Engineer's Office, Engineering plastic handbook, 1985, with a partial English translation.

Oct. 21, 2019, International Search Report issued in the International Patent Application No. PCT/JP2019/029988.

(Continued)

*Primary Examiner* — Irina S Zemel
(74) *Attorney, Agent, or Firm* — KENJA IP LAW PC

(57) ABSTRACT

Polyamide pre-expanded particles of this disclosure have a peak temperature of a maximum endothermic peak of 150-275° C. on a DSC curve obtained while being heated from 30° C. to 280° C. at a heating rate of 10° C./min using a DSC. The width of the peak is 30-80° C. when a straight line approximating the DSC curve on a high-temperature side relative to the peak after an end of melting is used as a baseline. The width corresponds to a difference between an extrapolated melting start temperature which is a temperature at an intersection point between a tangent line at an inflection point of the peak on a low-temperature side and the baseline, and an extrapolated melting end temperature which is a temperature at an intersection point between a tangent line at an inflection point of the peak on a high-temperature side and the baseline.

15 Claims, 2 Drawing Sheets

(56) References Cited

OTHER PUBLICATIONS www.hitachi-hightech.com, Retrieved on Aug. 6, 2021, from URL: https://www.hitachi-hightech.com/hhs/support/service/maintenance/thermal/consumables.html with a partial English translation.
Tatsuko Hatakeyama, Practices for Thermal Measurements, Journal of Fiber Science and Technology, 1975, pp. 289-294, vol. 31, No. 9 with a partial English translation.
Sep. 1, 2021, the Supplementary European Search Report issued by the European Patent Office in the corresponding European Patent Application No. 19847208.6.

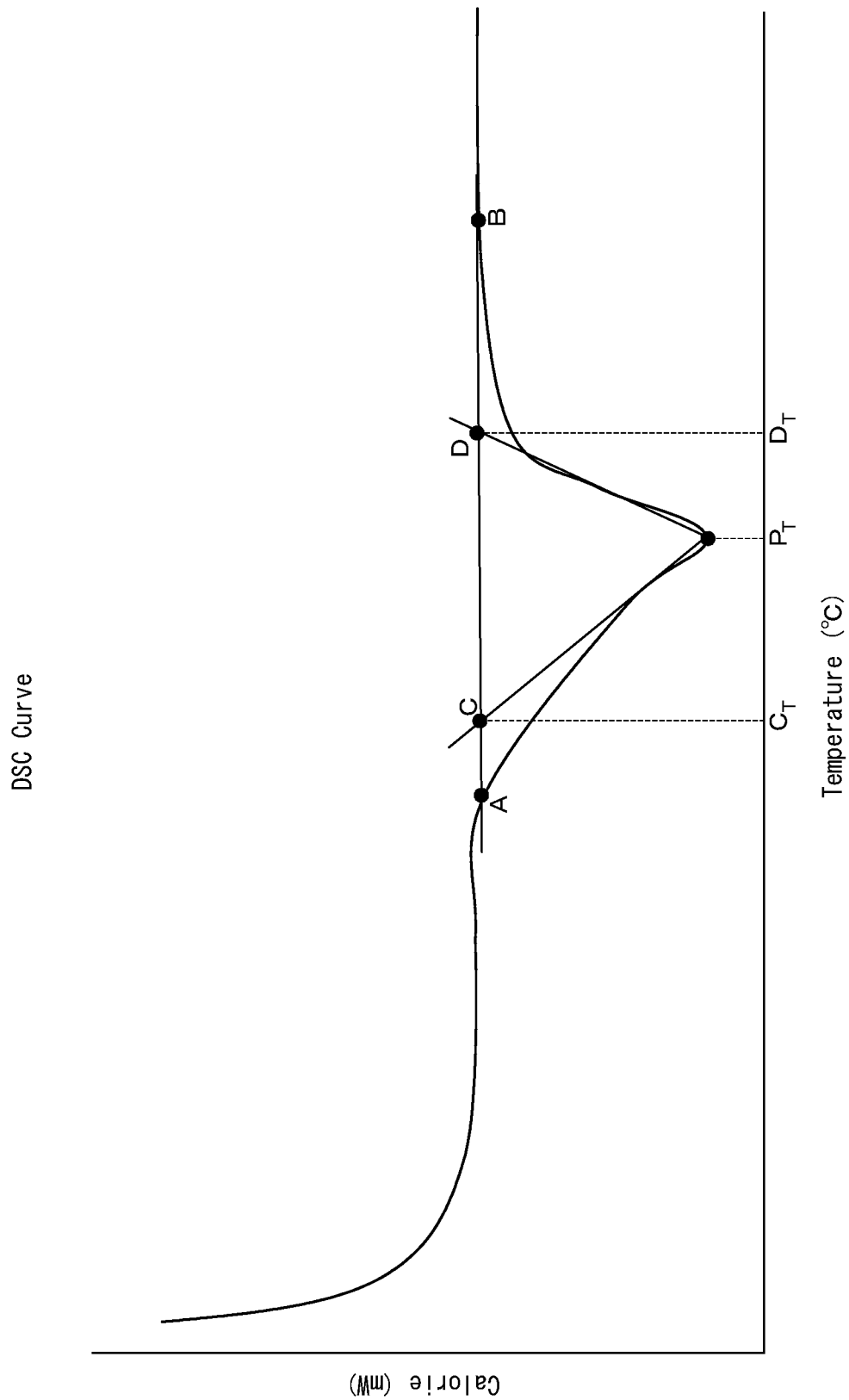

POLYAMIDE PRE-EXPANDED PARTICLES, AND POLYAMIDE FOAM MOLDED ARTICLE AND METHOD OF PRODUCING THE SAME

TECHNICAL FIELD

The present disclosure relates to polyamide pre-expanded particles, and a polyamide foam molded article and a method of producing the same.

BACKGROUND

Resin foams have been used for structural materials for components of automobiles and electronic devices and containers, as alternative materials to conventional solid resin materials and metal materials. Such resin foams have low density, high thermal insulation capability, and good cushioning property, which have been effectively utilized.

Examples of conventional resin foams include general-purpose resins such as polyethylene, polystyrene, and polypropylene that excel in terms of lightweightness, impact resistance, and so forth. Foam molded articles of these general-purpose resins are suitably used as cushioning materials and the like. However, due to the poor heat resistance of these general-purpose resins, it has not been possible to use these general-purpose resins for components that are required to have high heat resistance, such as automotive components.

On the other hand, engineering resins, particularly polyamide resins, are known as plastics having high heat resistance in addition to excellent wear resistance, chemical resistance, and so forth. Accordingly, foam molded articles of polyamide resins are considered to be of use in applications for which higher heat resistance is required.

Examples of techniques for producing foam molded articles include extrusion foaming, foam injection molding, and in-mold foam molding (also referred to as bead foam molding).

Extrusion foaming is a method in which an organic or inorganic foaming agent is injected into a molten resin using an extruder and the pressure is subsequently released at an outlet of the extruder to obtain a plate, sheet, or columnar foam having a specific cross-sectional shape, and then the foam is heat processed in a mold or is cut and adhered to shape the foam into a desired shape.

Foam injection molding is a method in which an expandable resin is injection molded and foamed in a mold to obtain a foam molded article including pores.

In-mold foam molding is a method in which expandable resin pre-expanded particles are loaded into a mold, are heated by steam or the like to cause foaming simultaneously with thermal fusion of the pre-expanded particles to one another to obtain a foam molded article. In-mold foam molding is widely used in industry due to advantages such as ease of freely setting the product shape, ease of obtaining a foam molded article with a high expansion ratio, and so forth.

Productions of a polyamide resin foam molded article by employing the in-mold foam molding have been disclosed. PTL 1 discloses a method in which polyamide expanded particles are heated in two stages to achieve more uniform foaming to thereby facilitate molding.

CITATION LIST

Patent Literature

PTL 1: JP 6068737 B

SUMMARY

Technical Problem

Prior art polyamide pre-expanded particles, however, have a problem in that mutual diffusions of a resin between expanded particles are insufficient at a fused interface which is formed during molding and this fused interface may serve as a starting point of breakage under a bending stress, which results in insufficient mechanical strength.

It could thus be helpful to improve the moldability of polyamide pre-expanded particles during in-mold foam molding to impart a sufficient mechanical strength, and to provide a polyamide foam molded article having a sufficient mechanical strength and a method of producing the same.

Solution to Problem

Through extensive studies for solving the above-mentioned problem, we have found that the problem could be solved by using polyamide resin pre-expanded particles having a certain peak temperature of the maximum endothermic peak on a DSC curve obtained while being heated from 30° C. to 280° C. under the condition of a heating rate of 10° C./min using a differential scanning calorimeter, thereby completing the present disclosure. In particular, we have found that the fusibility of particles during molding is improved and the bending breaking strength is improved by moisturizing the polyamide resin pre-expanded particles as a pretreatment before molding.

Specifically, the present disclosure provides the following:

(1) Polyamide pre-expanded particles,
  having a peak temperature of a maximum endothermic peak of 150° C. or higher and 275° C. or lower on a DSC curve obtained while being heated from 30° C. to 280° C. under a condition of a heating rate of 10° C./min using a differential scanning calorimeter,
  wherein a width of the maximum endothermic peak is 30° C. or greater and 80° C. or smaller when a straight line approximating the DSC curve on a high temperature side relative to the maximum endothermic peak after an end of melting is used as a baseline, the width corresponding to a difference between an extrapolated melting start temperature which is a temperature at an intersection point between a tangent line at an inflection point of the maximum endothermic peak on a low temperature side and the baseline, and an extrapolated melting end temperature which is a temperature at an intersection point between a tangent line at an inflection point of the maximum endothermic peak on a high temperature side and the baseline.

(2) The polyamide pre-expanded particles according to (1), wherein the particles contain water in a ratio of 4.5 mass % or more and 15 mass % or less.

(3) The polyamide pre-expanded particles according to (1) or (2), wherein a ratio D1/D2 of an average particle size (D1) and an average cell size (D2) of closed cells is 6.0 or more.

(4) The polyamide pre-expanded particles according to any one of (1) to (3), wherein the polyamide is polyamide 6/66.
(5) The polyamide pre-expanded particles according to any one of (1) to (4), wherein the particles have a hollow portion or a recessed external shape.
(6) The polyamide pre-expanded particles according to any one of (1) to (5), wherein a surface-adhesion water ratio is 14% or less.
(7) The polyamide pre-expanded particles according to any one of (1) to (6), wherein the surface-adhesion water ratio is smaller than a water content ratio inside the particles.
(8) A polyamide foam molded article comprising:
polyamide pre-expanded particles according to any one of (1) to (7) which are fused together.
(9) A method of producing a polyamide foam molded article comprising:
thermally fusing polyamide pre-expanded particles according to any one of (1) to (7).
(10) A method of producing a polyamide foam molded article comprising:
performing a moisturizing treatment to cause the polyamide pre-expanded particles according to any one of (1) to (7) to contain water in a ratio of 3 mass % or more and 15 mass % or less; and
then thermally fusing the polyamide pre-expanded particles.
(11) The method of producing a polyamide foam molded article according to (10), wherein the moisturizing treatment comprises immersing the polyamide pre-expanded particles in hot water at 40° C. or higher.
(12) The method of producing a polyamide foam molded article according to (10) or (11), wherein time of the moisturizing treatment is 30 minutes or less.
(13) The method of producing a polyamide foam molded article according to any one of (10) to (12), further comprising a step of removing water adhered to surfaces so that a surface-adhesion water ratio is 14% or less after performing the moisturizing treatment on the polyamide pre-expanded particles.
(14) The method of producing a polyamide foam molded article according to (13), further comprising a step of removing the water adhered to the surfaces so that the surface-adhesion water ratio is smaller than a water content ratio after performing the moisturizing treatment on the polyamide pre-expanded particles.
(15) A method of producing a polyamide foam molded article comprising:
loading the polyamide pre-expanded particles according to any one of (1) to (7) into a mold;
heating the polyamide pre-expanded particles with saturated steam at a temperature equal to or lower than a molding temperature minus 5° C. for 1 second or more and 10 seconds or less, the molding temperature being 100° C. or higher; and
then thermally fusing the polyamide pre-expanded particles with saturated steam at the molding temperature.
(16) A method of producing a polyamide foam molded article comprising:
loading polyamide pre-expanded particles containing water in a water content ratio of 0 mass % or more and 12 mass % or less, into a mold;
heating the polyamide pre-expanded particles with saturated steam at a temperature equal to or lower than a molding temperature minus 5° C. for 15 seconds or more, the molding temperature being 100° C. or higher; and
then thermally fusing the polyamide pre-expanded particles with saturated steam at the molding temperature.

Advantageous Effect

The present disclosure can provide polyamide pre-expanded particles capable of providing a polyamide foam molded article excellent in mechanical strength and moldability, a polyamide foam molded article excellent in mechanical strength and moldability, and a method of producing a polyamide foam molded article having improved fusibility of particles during molding and excellent in mechanical strength.

BRIEF DESCRIPTION OF THE DRAWINGS

In the accompanying drawings:
FIG. 2 is a diagram illustrating an example of a DSC curve of polyamide pre-expanded particles of the present disclosure obtained when being heated from 30° C. to 280° C. under the condition of a heating rate of 10° C./min using a differential scanning calorimeter.

DETAILED DESCRIPTION

Figure 1A:
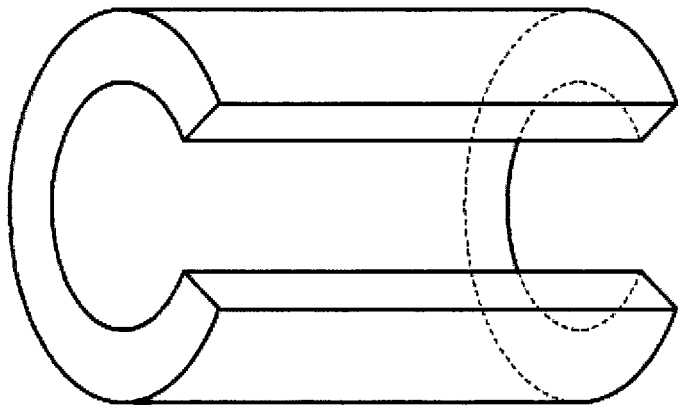
FIG. 1 is a drawing illustrating cross sections of polyamide pre-expanded particles having a hollow portion or a recessed external shape of the present disclosure.

The following provides a detailed description of a disclosed embodiment (hereinafter, referred to as the "present embodiment"). However, the following embodiment is merely an example provided for explanation. The disclosed products and methods are not limited to the following embodiment and various modifications may be made within the essential scope thereof in implementation. Note that, in the embodiments of this disclosure, the expression "A (value) to B (value)" means A or more and B or less.

[Polyamide Pre-Expanded Particles]

Polyamide pre-expanded particles of the present embodiment have a peak temperature of the maximum endothermic peak of 150° C. or higher and 275° C. or lower on a DSC curve obtained while being heated from 30° C. to 280° C. under a condition of a heating rate of 10° C./min using a differential scanning calorimeter, wherein the width of the maximum endothermic peak is 30° C. or greater and 80° C. or smaller when a straight line approximating the DSC curve on the high temperature side relative to the maximum endothermic peak after an end of melting is used as a baseline, the width corresponding to the difference between an extrapolated melting start temperature which is the temperature at the intersection point between the tangent line at the inflection point of the maximum endothermic peak on the low temperature side and the baseline, and an extrapolated melting end temperature which is the temperature at the intersection point between the tangent line at the inflection point of the maximum endothermic peak on the high temperature side and the baseline.

This enables the polyamide pre-expanded particles to sufficiently foam during foam molding.

The following provides a detailed description of the polyamide resin contained in the polyamide pre-expanded particles according to the present embodiment. Examples of the polyamide resin include polyamides, polyamide copolymers, and mixtures thereof.

Examples of polyamides that can be used include those obtained through polycondensation of a diamine and a dicarboxylic acid, such as polyamide 66, polyamide 610, polyamide 612, polyamide 46, and polyamide 1212, and those obtained through lactam ring-opening polymerization, such as polyamide 6 and polyamide 12. Examples of polyamide copolymers that can be used include polyamide 6/66, polyamide 66/6, polyamide 66/610, polyamide 66/612, polyamide 66/6T (T represents a terephthalic acid component), polyamide 66/6I (I represents an isophthalic acid component), and polyamide 6T/6I. Of these examples, aliphatic polyamides are preferable, and polyamide 6, polyamide 66, polyamide 6/66, polyamide 66/6, and the like are more preferable. One of these examples may be used individually, or two or more of these examples may be used in combination.

Examples of mixtures of the preceding examples that can be used include a mixture of polyamide 66 and polyamide 6, a mixture of polyamide 66 and polyamide 612, a mixture of polyamide 66 and polyamide 610, a mixture of polyamide 66 and polyamide 6I, and a mixture of polyamide 66 and polyamide 6T. Of these examples, in the case of a polyamide resin that is a mixture, the polyamide resin preferably includes an aliphatic polyamide in an amount of greater than 50 mass %, and more preferably 60 mass % or more from a viewpoint of raising the crystallinity of the foam molded article and providing the foam molded article with sufficient heat resistance and fusion rate.

The melting point of the polyamide resin is a value measured in accordance with JIS K7121 by differential scanning calorimetry (DSC). Peaks appearing in measurement that indicate heat absorption are determined to be peaks that indicate melting of the resin and the melting point is determined to be the temperature corresponding to a peak indicating heat absorption that appears at a highest temperature.

The measurement device that is used may be a commercially available differential scanning calorimeter such as DSC 7 manufactured by PerkinElmer Inc.

The measurement conditions may be commonly used conditions. For example, an inert gas atmosphere may be adopted and, in terms of temperature conditions, the resin may be held at a temperature higher than the melting point thereof, may be subsequently cooled rapidly to approximately room temperature at 20° C./min, and may then be heated to higher than the melting point thereof at 20° C./min.

High-reactivity functional groups at ends of the polyamide resin (i.e., amino groups and carboxyl groups) may be converted to low-reactivity functional groups through addition of an end-capping agent in synthesis of the polyamide resin (i.e., through end-capping of the polyamide resin).

In a situation in which an end-capping agent is added, the timing of addition may, for example, be at the time of charging of raw materials, the start of polymerization, a mid- to late-period of polymerization, or the end of polymerization.

No specific limitations are placed on the end-capping agent other than being a monofunctional compound capable of reacting with an amino group or a carboxyl group of the polyamide resin. Examples of end-capping agents that can be used include monocarboxylic acids, monoamines, acid anhydrides, monoisocyanates, monoacid halides, monoesters, and monoalcohols. One of these examples may be used individually, or two or more of these examples may be used in combination.

The amine value and the acid value of the polyamide resin may each be 0 equivalents/$1\times10^6$ g or more, and are preferably 200 equivalents/$1\times10^6$ g or less, and more preferably 100 equivalents/$1\times10^6$ g or less from a viewpoint of inhibiting gelation or degradation of the polyamide resin during melt retention and from a viewpoint of inhibiting problems such as coloration and hydrolysis in the environment of use of the resin.

The saturated water absorption (at 23° C. and 100% RH) of the polyamide resin is preferably 3% or more because expanded particles can exhibit an excellent fusibility after the expanded particles are subjected to a moisturizing treatment when the saturated water absorption is within this range. The saturated water absorption is more preferably 6% or more.

Examples of components other than the polyamide resin that may be contained in the polyamide pre-expanded particle according to the present embodiment to the extent that the objectives described herein are not impeded include stabilizers, impact modifiers, flame retardants, lubricants, pigments, dyes, weather resistance modifiers, antistatic agents, impact resistance modifiers, crystal nucleating agents, glass beads, inorganic fillers, crosslinking agents, nucleating agents such as talc, and other thermoplastic resins. In the polyamide resin foam molded article according to the present embodiment, the content of such other components per 100 parts by mass of the polyamide resin may be 15 parts by mass or less, is preferably 6 parts by mass or less, and is more preferably 3 parts by mass or less.

Examples of stabilizers that can be used include, but are not specifically limited to, organic antioxidants and heat stabilizers such as hindered phenol antioxidants, sulfuric antioxidants, phosphoric antioxidants, phosphite compounds, and thioether compounds; light stabilizers and ultraviolet absorbers such as those based on hindered amines, benzophenone, and imidazole; and metal deactivators. One of these examples may be used individually, or two or more of these examples may be used in combination.

A copper compound is preferably used as a heat stabilizer from a viewpoint of effectively preventing long-term heat aging in a high-temperature environment of 120° C. or higher. Moreover, a combination of the copper compound with an alkali metal halide compound is also preferable. Examples of alkali metal halide compounds that can be used include lithium chloride, lithium bromide, lithium iodide, sodium fluoride, sodium chloride, sodium bromide, sodium iodide, potassium fluoride, potassium chloride, potassium bromide, and potassium iodide. One of these examples may be used individually, or two or more of these examples may be used in combination.

The flame retardant is preferably, but not specifically limited to, a combination of a halogen-containing flame retardant and an antimony compound.

Examples of preferable halogen-containing flame retardants include brominated polystyrene, brominated polyphenylene ether, brominated bisphenol epoxy resin, brominated styrene-maleic anhydride copolymer, brominated epoxy resin, brominated phenoxy resin, decabromodiphenyl ether, decabromobiphenyl, brominated polycarbonate, perchlorocyclopentadecane, and brominated crosslinked aromatic polymers. Examples of preferable antimony compounds include antimony trioxide, antimony pentoxide, and sodium antimonate.

A combination of dibromopolystyrene and antimony trioxide is preferable as the flame retardant from a viewpoint of heat stability.

Non-halogen-containing flame retardants may also be used as flame retardants, specific examples of which include melamine cyanurate, red phosphorus, phosphinic acid metal salts, and nitrogen containing phosphoric acid compounds. In particular, a combination of a phosphinic acid metal salt and a nitrogen-containing phosphoric acid compound (for example, inclusive of a reaction product or mixture of polyphosphoric acid and melamine or a condensation product of melamine (melam, melon, etc.)) is preferable.

In cases where the average cell size of the polyamide pre-expanded particles needs to be adjusted, a cell modifier may be added. Examples of the cell modifier include inorganic nucleating agents such as talc, silica, calcium silicate, calcium carbonate, aluminum oxide, titanium oxide, diatomaceous earth, clay, sodium bicarbonate, alumina, barium sulfate, aluminum oxide, and bentonite. The amount of the cell modifier used is typically 0.005 parts by mass to 5 parts by mass relative to the total amount of raw materials of the resin foam particles.

[Method of Producing Polyamide Pre-Expanded Particles]

The polyamide pre-expanded particles can be produced by a method employing thermoplasticity of a thermoplastic resin, or a method by post-processing such as cutting of particles in the solid state, for example. Any methods capable of imparting desired outer shapes to particles can be used. Among them, as a method which has an excellent productivity and is capable of producing particles with stable shapes, a melt extrusion method using a die provided with a discharge cross section can be suitably used. A conventional well-known melt extrusion method can be arbitrarily applied for production. Examples of such a conventional melt extrusion method include, for example, a method in which a thermoplastic resin is melt extruded by an extruder and is pelletized using industrially common method such as strand cut or underwater cut, and the resultant pellets are foamed to produce expanded particles; a method in which a foaming agent is injected into an extruder in a middle of a barrel to cause foaming simultaneously with the ejection, thereby directly producing expanded particles by underwater cut or strand cut after cooling; and a method in which a resin is melt in an extruder, extruded from a die having a desired cross-sectional shape, cooled, and then cut by a pelletizer into a predetermined length to produce base resin pellets, which are impregnated with a foaming agent and are heated to foam at a predetermined expansion ratio.

The foaming agent used in production of the polyamide pre-expanded particles according to the present embodiment is not specifically limited and may, for example, be air or a compound that can be set in a gaseous state.

Examples of compounds settable in a gaseous state that may be used include inorganic compounds such as carbon dioxide, nitrogen, oxygen, hydrogen, water, argon, helium, and neon; fluorocarbons such as trichlorofluoromethane (R11), dichlorodifluoromethane (R12), chlorodifluoromethane (R22), tetrachlorodifluoroethane (R112), dichlorofluoroethane (R141b), chlorodifluoroethane (R142b), difluoroethane (R152a), HFC-245fa, HFC-236ea, HFC-245ca, and HFC-225ca; hydrofluoroolefins such as HFO-1234y and HFO-1234ze(E); saturated hydrocarbons such propane, n-butane, i-butane, n-pentane, i-pentane, and neopentane; ethers such as dimethyl ether, diethyl ether, methyl ethyl ether, isopropyl ether, n-butyl ether, diisopropyl ether, furan, furfural, 2-methylfuran tetrahydrofuran, and tetrahydropyran; chlorinated hydrocarbons such as methyl chloride and ethyl chloride; and alcohols such as methanol and ethanol.

The air or compound that can be set in a gaseous state may be a single type used individually or a combination of two or more types.

[Shape of Polyamide Pre-Expanded Particles]

The polyamide pre-expanded particles of the present embodiment may be imparted with any three-dimensional shape. This three-dimensional shape enables communicating pores to be formed in a foam molded article to thereby impart a sound absorbing characteristic. Although polyamide pre-expanded resin particles may have any orthographic projection shape, a solid bead shape typically refers to a substantial sphere having a circular or elliptical orthographic projection shape.

The expression "having a hollow portion" which is one embodiment of the present disclosure means that an orthographic projection shape of a polyamide pre-expanded particle has a hollow region inside the particle and an outer peripheral region surrounding the hollow circular region, and means that a direction is present in which an orthographic projection shape having the hollow region and the outer peripheral region is observable.

Alternatively, the expression "having a recessed external shape" means that the shape of a resin expanded particle is selected such that the recessed external shape satisfies the conditions of a recess and/or through hole described above. This enables favorable formation of communicating pores (continuous pores or pores which communicate to each other) in a polyamide foam molded article after fusion molding.

Although the recessed external shape of the polyamide pre-expanded particle may or may not have a through hole in the present embodiment, the polyamide pre-expanded particle particularly preferably has a recessed portion. Provision of a recessed portion helps to achieve a loading state which could have not been achieved by conventional polyamide pre-expanded particles, and to achieve a particularly well balance of the sound absorbing characteristic and the mechanical strength in the structures of communicating pores in a polyamide foam molded article obtained after molding.

One particularly excellent shape example as the recessed portion is a structure in which a grooved recessed portion is provided in a polyamide pre-expanded particle. During production of a polyamide foam molded article, polyamide pre-expanded particles are loaded so that grooved recessed portions of adjacent polyamide pre-expanded particles partially engage with each other, and the polyamide pre-expanded particles are thermally fused together. As a result, the bonding area between the polyamide pre-expanded particles is increased and the polyamide foam molded article has a high strength. Further, where adjacent polyamide pre-expanded particles are adhered to each other with grooves in the adjacent polyamide pre-expanded particles being contiguous, pores, i.e., communicating pores, are formed across the polyamide foam molded article.

Figure 1B:
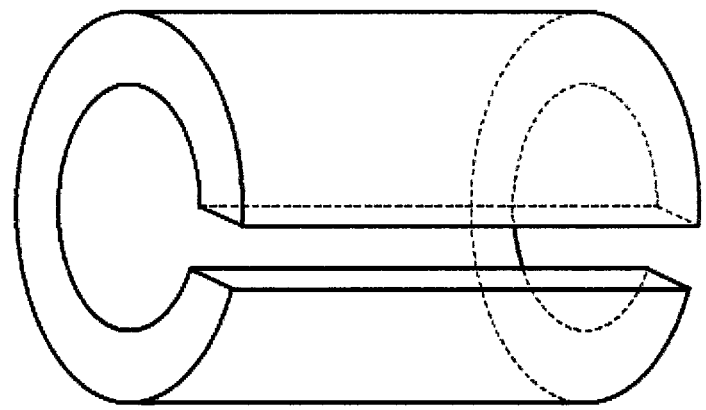
Figure 1C:
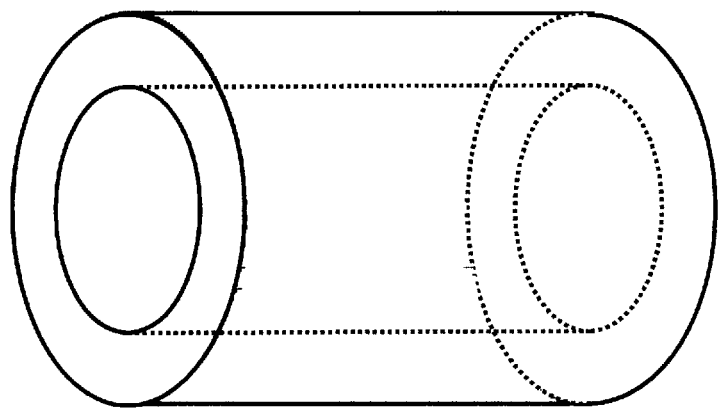

Examples of the grooved recessed portion include a stack of cross sections of a partially-cut hollow substantial circle (such as C shape or U shape) (FIG. 1 (a) or (b)), and a stack of cross sections of a partially-cut hollow substantial polygon (such as a triangle or rectangle). Although the hollow in the approximate circle or the hollow in the approximate polygon may be approximately circular or approximately polygonal, the hollow preferably has the same shape as the shape of the portion surrounding the hollow. Moreover, preferred is a shape where the center of the shape of the hollow coincides with the center of the shape of the portion surrounding the hollow (for example, a concentric O-shape is preferred).

An example of the hollow portion is, for example, a stack of hollow circles (circles or ellipses) (FIG. 1 (c)).

In the present embodiment, whether or not a polyamide pre-expanded particle has a hollow portion or a recessed external shape can be determined by observing a transmission image of the polyamide pre-expanded particle under an optical microscope while varying the direction to observe the particle.

[Maximum Endothermic Peak of Polyamide Pre-Expanded Particles]

The polyamide pre-expanded particles of the present embodiment have a peak temperature of the maximum endothermic peak of 150° C. or higher and 275° C. or lower on a DSC curve obtained while being heated from 30° C. to 280° C. under the condition of a heating rate of 10° C./min using a differential scanning calorimeter. The peak temperature of the maximum endothermic peak is preferably 155° C. or higher and 220° C. or lower, and more preferably 160° C. or higher and 190° C. or lower. The peak temperature of the maximum endothermic peak within one of the above ranges facilitates foam molding using saturated vapor, which tends to be preferable in practical use.

In addition, in the polyamide pre-expanded particles of the present embodiment, the width of the maximum endothermic peak on the DSC curve is 30° C. or greater and 80° C. or smaller when a straight line approximating the DSC curve on a high temperature side relative to the maximum endothermic peak after an end of melting is used as a baseline, the width corresponding to the difference between an extrapolated melting start temperature which is the temperature at the intersection point between the tangent line at the inflection point of the maximum endothermic peak on the low temperature side and the baseline, and an extrapolated melting end temperature which is the temperature at the intersection point between the tangent line at the inflection point of the maximum endothermic peak on the high temperature side and the baseline. The width of the maximum endothermic peak is preferably 35° C. or greater and 75° C. or smaller, and more preferably 40° C. or greater and 70° C. or smaller. When the width of the maximum endothermic peak is within one of the above ranges, the material strength is prevented from being reduced due to breakage of foams of the expanded particles while the fusing force among the expanded particles under the temperature condition is enhanced, which tends to improve the formability.

In cases where a plurality of endothermic peaks are present, the maximum endothermic peak is the peak where the heat absorption is maximized.

FIG. 2 is a diagram illustrating an example of a DSC curve of the polyamide pre-expanded particles of the present embodiment obtained when being heated from 30° C. to 280° C. under the condition of a heating rate of 10° C./min using a differential scanning calorimeter. In FIG. 2, A is the intersection point between the DSC curve on the lower temperature side relative to the maximum endothermic peak and the baseline, B is the intersection point between the DSC curve on the higher temperature side relative to the maximum endothermic peak and the baseline, C is the intersection point between the tangent line at the inflection point on the lower temperature side relative to the maximum endothermic peak and the baseline, and D is the intersection point between the tangent line at the inflection point on the higher temperature side of the maximum endothermic peak and the baseline. $C_T$ is the extrapolated melting start temperature, $D_T$ is the extrapolated melting end temperature, and $P_T$ is the peak temperature of the maximum endothermic peak. The width of the maximum endothermic peak corresponds to the difference obtained by subtracting $C_T$ from $D_T$.

The peak temperature of the maximum endothermic peak can be adjusted to 150° C. or higher and 275° C. or lower to thereby adjusting the width of the maximum endothermic peak to 30° C. or greater and 80° C. or smaller, for example, by appropriately selecting the type of the polyamide resin used for the polyamide pre-expanded particles, adjusting the water content ratio in the polyamide pre-expanded particles as described below, or the like.

[Solvent Treatment for Polyamide Pre-Expanded Particles]

A solvent treatment on the polyamide pre-expanded particles can reduce the viscosity of the polyamide resin composition under a high temperature environment during foam molding to thereby improve the fusibility of a resultant molded article, which in turn improves the mechanical strength, e.g., the bending breaking strength.

Examples of the solvent used in the solvent treatment include polar solvents such as water, ethanol, and methanol, and mixed solvents of these solvents may also be used.

Among these solvents, water is preferred from the viewpoint of its availability and ease of handling.

Hereinafter, an example in which water is used as a solvent for a solvent treatment for the polyamide pre-expanded particles will be described.

[Water Content Ratio of Polyamide Pre-Expanded Particles]

Performing a moisturizing treatment in advance so that the water content ratio of the polyamide pre-expanded particles is 3 mass % or more and 15 mass % or less can reduce the viscosity of the polyamide resin composition under a high temperature environment during foam molding in the subsequent heat fusion step to thereby improve the fusibility of a molded article, which in turn improves the mechanical strength, e.g., the bending breaking strength. This treatment is intended to increase the volume of bubbles in the polyamide expanded particles under the temperature condition during in-mold molding to expand the polyamide expanded particles, as well as decreasing the viscosity of the polyamide resin to promote the mutual diffusion of the resin between expanded particles.

When the water content ratio of the polyamide pre-expanded particles is more than 15 mass %, water is condensed in closed cells inside the polyamide pre-expanded particles. The water absorbs heat as it vaporizes while being heated in in-mold foam molding. Because the condensed water inside the particles is heated by heat conducting from the outer surfaces of the expanded particles, the heating efficiency inside the polyamide pre-expanded particles is lower than heating efficiency of water adhered to the surfaces outside the polyamide pre-expanded particles which are directly heated by the latent heat of steam, which prevents the temperature of the polyamide pre-expanded particles from increasing during the in-mold foam molding. As a result, expansion of the polyamide pre-expanded particles becomes insufficient and fusion of expanded particles is inhibited due to the insufficient expansion, so that expanded particles are more likely to be separated from each other at the interfaces and sufficient bending breaking strength cannot be obtained. From this perspective, the water content ratio of the polyamide pre-expanded particles is preferably 15 mass % or less, and more preferably 12 mass % or less.

In addition, appropriate adjustment of the water content ratio of the polyamide pre-expanded particles can also reduce deviations in foam sizes in a molded article. In the polyamide pre-expanded particles subjected to a moisturizing treatment, interactions between molecular chains caused by hydrogen bonds, which are observed in dry polyamide expanded particles, decrease. Thus, a change in the storage modulus at temperatures lower and higher than the glass transition temperature decreases, and the polyamide pre-expanded particles exhibit a uniform foaming behavior when the temperature abruptly changes during foam molding, which reduces deviation in particle sizes. Deviation in particle sizes may cause voids in the molded article, which may reduce the mechanical strength. From this perspective, in the present embodiment, the polyamide pre-expanded particles preferably contain water in a ratio of 3 mass % or more. The water content ratio is more preferably 4.5 mass % or more, and even more preferably 6 mass % or more.

The water content ratio of the polyamide pre-expanded particles is calculated from the weight of the polyamide pre-expanded particles (W0), the weight (W1) after water adhered to surfaces of the polyamide pre-expanded particles is removed, and the weight (W2) after the polyamide pre-expanded particles are dried at 80° C. in vacuum for 6 hours. The water content ratio (%) is calculated as follows: water content ratio=(W1−W2)/W2×100

In addition, for calculating the water content ratio of the polyamide pre-expanded particles having a hollow portion or a recessed external shape, a high-pressure gas can be used to remove water adhered to the surfaces of the hollow portion or the recessed external shape. For example, air or another gas adjusted to a blow speed of 100 m/sec or more can be suitably used.

When the ratio S2/S1 of the compressive stress (S1) when a 50%-strain is applied at 50° C. to the compressive stress (S2) when a 50%-strain is applied at 90° C., on this water-containing polyamide pre-expanded particle, is in the range of 0.2 or more and 1.0 or less, a uniform foaming behavior is achieved without being affected by a temperature variation in a molding machine, which promotes fusion of a molded article, so that a molded article having sufficient strength can be obtained.

In addition, from the viewpoint of reducing variation in the foam size, the ratio D1/D2 of the average particle size (D1) of the polyamide pre-expanded particles and the average cell size (D2) of closed cells is preferably 6.0 or more. When the ratio is within this range, strains among cell walls during expansion of closed cells are made uniform, which reduces the likelihood of internal breakages. If an internal breakage of foams occurs, the fusion rate of the expanded particles is reduced because the expanadability is significantly reduced. From this perspective, D1/D2 is more preferably 7.0 or more, and even more preferably 10 or more.

The average particle size of the polyamide pre-expanded particles is calculated by the test method employing test sieves specified in JIS Z8801.

In addition, the average cell size D2 (mm) of closed cells in a polyamide pre-expanded particle are measured as follows. The closed cell areas (S) of 30 cells are determined in a center surface of a polyamide pre-expanded particle in an image taken under an electron microscope or the like. The diameter $d=2(S/3.14)^{1/2}$ is determined for each closed cell assuming that the cell is circular. The addition average of the diameters of the 30 cells is determined as the average cell size (D2) of closed cells of the polyamide pre-expanded particle. The average cell size of polyamide pre-expanded particles having a hollow portion or a recessed external shape is calculated using the above method from a center surface prepared by cutting in the direction in which the shape of the hollow portion or the recessed external shape is observable.

The water content ratio of the polyamide pre-expanded particles can be adjusted by immersing the polyamide pre-expanded particles in warm water in a moisturizing treatment. Hot water at 40° C. or higher in the moisturizing treatment can increase the moisturizing speed, to thereby increase the efficiently of moisturizing. In addition, from the viewpoint of suppressing deformation of the pre-expanded particles at temperatures equal to or greater than the glass transition point, a moisturizing treatment is preferably performed at 70° C. or lower. In addition, the time for moisturizing the polyamide pre-expanded particles is preferably within 30 minutes and more preferably within 15 minutes, from the viewpoint of suppressing elution of additives inside the polyamide pre-expanded particles. In addition, the time for moisturizing the polyamide pre-expanded particles is preferably 1 minute or more from the viewpoint of increasing the uniformity of the treatment.

Further, the polyamide pre-expanded particles can be treated by a dehydrator or the like for removing water adhered to the surfaces of the polyamide pre-expanded particles after the moisturizing treatment. The rotation speed for the dehydration treatment is preferably 100 rpm or more and more preferably 500 rpm or more, from the viewpoint of reducing the processing time. Further, the rotation speed for the dehydration treatment is preferably 50000 revolutions or less. The time of the dehydration treatment is preferably within 10 minutes and more preferably within 5 minutes, in view of the productivity. Further, the time of the dehydration treatment is preferably 1 minute or more in view of the uniformity.

The surface-adhesion water ratio of the polyamide pre-expanded particles is calculated from the weight of the polyamide pre-expanded particles (W0), the weight (W1) after water adhered to the surfaces of the polyamide pre-expanded particles is removed, and the weight (W2) after the polyamide pre-expanded particles are dried at 80° C. in vacuum for 6 hours. The surface-adhesion water ratio (%) is calculated as follows: surface-adhesion water ratio=(W0−W1)/W2×100.

In addition, for calculating the water content ratio of the polyamide pre-expanded particles having a hollow portion or a recessed external shape, a high-pressure gas can be used to remove water adhered to the surfaces of the hollow portion or the recessed external shape. For example, air or another gas adjusted to a blow speed of 100 m/sec or more can be suitably used.

The surface-adhesion water ratio of the polyamide pre-expanded particles is preferably 14% or less. It is thus preferable to remove water adhered to the surfaces of the polyamide pre-expanded particles so that the surface-adhesion water ratio is 14% or less. When the surface-adhesion water ratio is 14% or less, aggregation of particles caused by interaction of water adhered to the surfaces is less likely to occur when the raw materials are loaded during in-mold foam molding, and the pre-expanded particles are closely loaded in the mold, to thereby enable production of a molded article with less sparse defects, as well as improving the mechanical strength. From this perspective, the surface-adhesion water ratio of the polyamide pre-expanded particles is more preferably 10% or less and even more preferably 7% or less.

Further, the surface-adhesion water ratio is preferably adjusted so as to be smaller than the water content ratio in the particles from the viewpoint of reducing variation in the amount of the air introduced to the polyamide pre-expanded particles when compressed air is introduced, as well as stabilizing the mechanical strength of the molded article.

As the method of subjecting polyamide pre-expanded particles to a moisturizing treatment, the water content ratio of a polyamide resin composition may be adjusted in advance before production of the polyamide pre-expanded particles. For example, polyamide pre-expanded particles having a high water content ratio can be produced by pelletizing an extruded molten resin in water at a higher temperature so that the water content ratio of pellets before foaming is adjusted to 5% or more, followed by foaming the pellets. The temperature upon the pelletization is preferably 40° C. or higher, and more preferably 50° C. or higher.

The solvent treatment has been described with reference to the example in which water is used. When the solvent used in the solvent treatment is ethanol, the polyamide pre-expanded particles are preferably treated in advance so that the ethanol content ratio is 3 mass % or more and 15 mass % or less, for example.

For measuring the ethanol content ratio and the water content ratio of the polyamide pre-expanded particles in the case where an ethanolizing treatment is performed, water and ethanol adhered to the surfaces are removed from the polyamide pre-expanded particles, follows by preparation of a measurement specimen by adding THF. Then, water and ethanol are quantified using the GC-MS-SIM (selected ion monitoring) technique. Specifically, from the weight of water W (water) and the weight of ethanol W (EtOH), the water content ratio is calculated as follows: water content ratio=W (water)/(100−W (water)−W (EtOH))×100, and the ethanol content ratio is calculated as follows: ethanol content ratio=W (EtOH)/(100−W (water)−W (EtOH))×100.

[Polyamide Foam Molded Article]

A polyamide foam molded article of the present embodiment includes the above-described polyamide pre-expanded particles which are fused to each other.

(Method of Producing Polyamide Foam Molded Article)

The polyamide foam molded article of the present embodiment can be molded into any three-dimensional shape by thermally fusing the polyamide pre-expanded particles.

Although the polyamide foam molded article of the present embodiment can be produced by loading the polyamide pre-expanded particles into a mold and closing the mold to expand the particles, a method may be employed in which the polyamide expanded particles are loaded in a mold which cannot be sealed, followed by heating, to thereby cause the resin expanded particles to be fused together. Depending on the type of resin and the molding conditions, a general-purpose in-mold automated foam molding machine may be used.

For promoting fusions of particles, the heating temperature of the polyamide pre-expanded particles is preferably 100° C. or higher and 270° C. or lower, and is more preferably 105° C. or higher 260° C. or lower. The molding method is not specifically limited and may, for example, be a method in which the pre-expanded particles are loaded into the cavity of a mold for molding and are heated to cause foaming simultaneously with thermal fusion of the pre-expanded particles to one another, and then cooling is performed to solidify and mold the resultant product. The method by which the pre-expanded particles are loaded is not specifically limited and examples thereof include a cracking method in which the pre-expanded particles are loaded into a mold in a slightly opened state, a compression method in which pressure compressed pre-expanded particles are loaded into a mold in a closed state, and a compression cracking method in which the above cracking method is adopted after loading pressure compressed pre-expanded particles into the mold.

Herein, it is preferable that the pre-expanded particles are pressure treated with a gas prior to being loaded into the cavity of the mold for molding from a viewpoint of applying uniform gas pressure in the cells of the pre-expanded particles and obtaining a uniform cell size within the particles. Although the conditions of the pressure treatment are not specifically limited, an ambient pressure of 0.3 MPa to 6.0 MPa and an ambient temperature of 5° C. to 50° C. are preferable, for example, from a viewpoint of pressurizing the pre-expanded particles with gas more efficiently.

Examples of the gas used in the pressure treatment include, but are not limited to, inorganic compounds such as carbon dioxide, nitrogen, oxygen, hydrogen, argon, helium, and neon; fluorocarbons such as trichlorofluoromethane (R11), dichlorodifluoromethane (R12), chlorodifluoromethane (R22), tetrachlorodifluoroethane (R112), dichlorofluoroethane (R141b), chlorodifluoroethane (R142b), difluoroethane (R152a), HFC-245fa, HFC-236ea, HFC-245ca, and HFC-225ca; hydrofluoroolefins such as HFO-1234y and HFO-1234ze(E); saturated hydrocarbons such propane, n-butane, i-butane, n-pentane, i-pentane, and neopentane; ethers such as dimethyl ether, diethyl ether, methyl ethyl ether, isopropyl ether, n-butyl ether, diisopropyl ether, furan, furfural, 2-methylfuran tetrahydrofuran, and tetrahydropyran; chlorinated hydrocarbons such as methyl chloride and ethyl chloride; and alcohols such as methanol and ethanol.

Of these, an inorganic gas is preferable from a viewpoint of flame retardance, heat resistance, and dimensional stability.

The air or compound that can be set in a gaseous state may be a single type used individually or a combination of two or more types.

The heating medium used in molding of the polyamide resin pre-expanded particles may be a general-purpose heating medium, is preferably saturated steam or superheated steam from a viewpoint of inhibiting oxidative degradation of the foam molded article, and is more preferably saturated steam from a viewpoint of enabling uniform heating with respect to the foam molded article.

In the case where saturated steam is used as the heating medium, it is preferable to heat (preheat) the polyamide pre-expanded particles by saturated steam at a temperature equal to or lower than the molding temperature minus 5° C. for 1 second or more and 10 seconds or less, the molding temperature being 100° C. or higher, followed by thermally fusing the polyamide pre-expanded particles by saturated steam at the molding temperature.

The temperature of the saturated steam used for the preheating is a temperature equal to or lower than the molding temperature minus 5° C., preferably a temperature equal to or lower than the molding temperature minus 6° C., and more preferably a temperature equal to or lower than the molding temperature minus 7° C. Further, the temperature of the saturated steam is preferably a temperature equal to or higher than the molding temperature minus 15° C., more preferably a temperature equal to or higher than the molding temperature minus 14° C., and even more preferably a temperature equal to or higher than the molding temperature minus 13° C. When the temperature is within one of the above ranges, diffusion of water into the polyamide pre-expanded particles tends to be promoted while expansion and fusion of the polyamide pre-expanded particles are suppressed.

Further, the heating time with the saturated steam used for the preheating is 1 second or more and 10 seconds or less, preferably 1 second or more and 5 seconds or less, and more preferably 1 second or more and 3 seconds or less. Conventionally, there has been a problem in that the total time required for molding is extended by a step of preheating polyamide pre-expanded particles to a temperature near the molding temperature, which reduces the productivity. When the heating time is within one of the above ranges, diffusion of water into the polyamide pre-expanded particles can be promoted while reducing the above problem within a practically acceptable level, which tends to improve the fusibility at the molding temperature.

An alternative aspect of the method of producing a polyamide foam molded article of the present embodiment includes loading the polyamide pre-expanded particles with a water content ratio of 0 mass % or more and 12 mass % or less into a mold; heating the polyamide pre-expanded particles with saturated steam at a temperature equal to or lower than a molding temperature minus 5° C. for 15 seconds or more, the molding temperature being 100° C. or greater; and then thermally fusing the polyamide pre-expanded particles with saturated steam at the molding temperature.

This manufacturing method enables production of a polyamide foam molded article which has improved fusibility of the polyamide pre-expanded particles during molding and is excellent in mechanical strength.

In an alternative aspect of the method of producing a polyamide foam molded article of the present embodiment, the method of loading the polyamide pre-expanded particles into a cavity of a mold for molding is not particularly limited, and examples of the method include the cracking method, the compression method, and the compression cracking method described above.

Further, the polyamide pre-expanded particles may be subjected to a solvent treatment before being loaded into the cavity of the mold for molding. The solvent used in the solvent treatment, the solvent treatment method, and the like may be the same as the ones described above.

Further, the polyamide pre-expanded particles are preferably subjected to a pressure treatment with a gas before they are loaded into the cavity of the mold for molding. The method of the pressure treatment, the gas used for the pressure treatment, and the like can be the same as the ones described above.

In an alternative aspect of the method of producing a polyamide foam molded article of the present embodiment, the molding temperature of the polyamide pre-expanded particles is 100° C. or higher, preferably 100° C. or higher and 270° C. or lower, and more preferably 105° C. or higher and 260° C. or lower, from the viewpoint of promoting fusion of particles.

In an alternative aspect of the method of producing a polyamide foam molded article of the present embodiment, the polyamide pre-expanded particles are heated (preheated) with saturated steam at a temperature equal to or lower than the molding temperature minus 5° C. for 15 seconds or more, before they are heated by saturated steam at the molding temperature.

The temperature of the saturated steam used for the preheating is a temperature equal to or lower than the molding temperature minus 5° C., preferably a temperature equal to or lower than the molding temperature minus 6° C., and more preferably a temperature equal to or lower than the molding temperature minus 7° C. Further, the temperature of the saturated steam is preferably a temperature equal to or higher than the molding temperature minus 15° C., more preferably a temperature equal to or higher than the molding temperature minus 14° C., and even more preferably a temperature equal to or higher than the molding temperature minus 13° C. When the temperature of the saturated steam is within one of the above ranges, diffusion of water into the polyamide pre-expanded particles tends to be promoted while expansion and fusion of the polyamide pre-expanded particles are suppressed.

Further, the heating time with the saturated steam used for the preheating is 15 seconds or more, preferably 15 seconds to 120 seconds, and more preferably 30 seconds to 90 seconds. Conventionally, there has been a problem in that the total time required for molding is extended by a step of preheating polyamide pre-expanded particles to a temperature near the molding temperature, which reduces the productivity. When the heating time is within one of the above ranges, diffusion of water into the polyamide pre-expanded particles can be promoted while reducing the above problem within a practically acceptable level, which tends to improve the fusibility at the molding temperature.

In an alternative aspect of the method of producing a polyamide foam molded article of the present embodiment, the water content ratio of the polyamide pre-expanded particles is 0 mass % or more and 12 mass % or less, preferably 1.5 mass % or more and 12 mass % or less, and more preferably 3 mass % or more and 12 mass % or less in view of the fusibility.

In this alternative aspect, the polyamide resin and components other than the polyamide resin contained in the polyamide pre-expanded particles, and the shape of the polyamide pre-expanded particles can be the same as the ones described above.

[[Bending Strength of Molded Article]]

After molding of the polyamide foam molded article of the present disclosure, the foam molded article was dried at 60° C. for 24 hours using a dryer to remove moisture contained in the molded article. The bending strength (MPa) of the polyamide foam molded article was then measured in accordance with JIS K7171. From the viewpoint of the reliability of the molded article to be used as a structural member, the bending strength is preferably 2.8 MPa or more, more preferably 3.0 MPa or more, and even more preferably 3.3 MPa or more.

[[Bending Elastic Modulus of Molded Article]]

A specimen (dimensions of the specimen: 300 mm in length, 40 mm in width, and 20 mm in thickness) of a resin foam molded article can be prepared for a measurement. The bending elastic modulus of the polyamide foam molded article is measured according to JIS K7171 (2008).

The bending elastic modulus is preferably 50 MPa or more, more preferably 70 MPa, and even more preferably 80 MPa or more.

EXAMPLES

The following describes embodiments of the present disclosure with reference to examples. The scope of the present disclosure, however, is not in any way limited by these examples.

Evaluation methods used in Examples and Comparative Examples will be described below.

(1-1) Water Content of Polyamide Pre-Expanded Particles

Polyamide pre-expanded particles were weighed (W0). The polyamide pre-expanded particles were then spread on a dry fiber sheet (Kim Towel available from Nippon Paper Industries Co., Ltd.) and water adhered to surfaces was removed with another fiber sheet. The polyamide pre-expanded particles were then weighed (W1). The polyamide pre-expanded particles were dried at 80° C. in vacuum for 6 hours, and were weighed again (W2). The water content ratio (%) was calculated as follows: water content ratio= (W1−W2)/W2×100 and the surface-adhesion water ratio (%) was calculated as follows: surface-adhesion water ratio= (W0−W1)/W2×100.

(1-2) Water Content of Polyamide Pre-Expanded Particles Having Hollow or Recessed Outer Shape Polyamide pre-expanded particles were weighed (W0). The polyamide pre-expanded particles were then placed in a gas-permeable wire net, and the air was blown by an air gun having a blow speed of 100 m/s to remove water adhered to the surfaces for 10 seconds. The polyamide pre-expanded particles were then weighed (W1). The polyamide pre-expanded particles were dried at 80° C. in vacuum for 6 hours, and were weighed again (W2). The water content ratio (%) was calculated as follows: water content ratio= (W1−W2)/W2×100 and the surface-adhesion water ratio (%) was calculated as follows: surface-adhesion water ratio= (W0−W1)/W2×100.

(1-3) Ethanol Content Ratio and Water Content Ratio of Polyamide Pre-Expanded Particles when being Subjected to Ethanolizing Treatment (i) Water and ethanol adhered to surfaces of polyamide pre-expanded particles were removed in the same manner as in (1-1) described above, and 1 g of the polyamide pre-expanded particles were weighed out and placed into a glass conical flask. The flask was then charged with 20 mL of THF, and heated at 50° C. for 1 hour while the flask was sealed with a stopper. The solution was cooled to room temperature. THF was then added to 2 mL of the solution so that the total volume became 5 mL.

This sample was transferred to a GC vial tube, and water and ethanol were quantified by the GC-MS-SIM (selected ion monitoring) technique. The peaks used were m/z=18 for water and m/z=45 for ethanol.

Respective reference samples in three different concentration levels were prepared by weighing ethanol and distilled water, dissolving them into THF, and analyzing them by the GC-MS-SIM (selected ion monitoring) technique to obtain a calibration curve from the concentrations and SIM areas.

<GC-MS Measurement Conditions>

GC-MS apparatus: HP 6890N-5973 manufactured by Agilent Oven: The temperature was maintained to 50° C. for 1 minute, and was then raised from 50° C. to 130° C. at 10° C./min.

Front injection port temperature: 200° C.

Split ratio: 20:1

Column: WATERCOL 1910 29711U manufactured by Sigma-Aldrich

Length: 30.0 m; inner diameter: 0.25 mm; film thickness: 0.20 μm; and flow rate: 1.0 mL/min (ii) From the weight of water W (water) and the weight of ethanol W (EtOH), which were quantitative values (%) obtained in (i), the water content ratio was calculated as follows: water content ratio=W (water)/(100−W (water)−W (EtOH))×100, and the ethanol content ratio was calculated as follows: ethanol content ratio=W (EtOH)/(100−W (water)−W (EtOH))×100.

(2) Bending Strength of Polyamide Foam Molded Article

The bending strength of a polyamide foam molded article was calculated according to JIS K7171 (2008). A resin foam molded article was subjected to a vacuum drying treatment at 40° C. for 24 hours or more, and a specimen (dimensions of the specimen: 300 mm in length, 40 mm in width, and 20 mm in thickness) of the resin foam molded article was prepared. The bending strength (MPa) was measured using an autograph (AG-5000D type) manufactured by Shimadzu Corporation while a load was being applied in the thickness direction.

(3) Specific Volume of Polyamide Foam Molded Article

A polyamide resin foam molded article was cut into a rectangular parallelepiped specimen, and the mass W (g) was measured. The volume V (cc) was calculated, and V/W (cc/g) was determined to be used as the specific volume.

(4) Loading Defect of Polyamide Foam Molded Article

A void defect where no expanded beads were present in a surface (100 mm×100 mm) of a polyamide resin foam molded article was imaged under a microscope, and an area of the void defect was calculated by imaging software. The imaging software used was ImageJ 1.48v (freeware, version 1.46, developed by Wayne Rasband, Jul. 10, 2014). The area (S) of the defect was calculated, and the diameter $d=2(S/3.14)^{1/2}$ was calculated assuming that the void was circular.

The specimen was rated as follows: "Present" when three or more voids with a void area of 1 $mm^2$ were observed, "Slight" when one or two voids were observed, or "Absent" when no defect was observed.

(5) Fusion Rate of Polyamide Foam Molded Article

A cutter knife was used to make an incision line of 5 mm in depth into the surface of a foam molded article having a plate shape of 300 mm in length, 300 mm in width, and 20 mm in thickness such as to divide the foam molded article in half lengthwise, and the foam molded article was then split along this line. With regards to pre-expanded particles appearing at the split surface, the number (a) of pre-expanded particles for which breaking occurred within the particle (i.e., pre-expanded particles broken by the split surface) and the number (b) of pre-expanded particles for which breaking occurred along the interface between pre-expanded particles (i.e., pre-expanded particles for which the interface between pre-expanded particles became the split surface) were counted, and the fusion rate (%) was calculated by the following formula (1).

$$\text{Fusion rate (\%)} = \{a/(a+b)\} \times 100 \quad (1)$$

(6) Average Particle Size D1 (Mm) of Polyamide Pre-Expanded Particles

The standard sieves specified in JIS Z8801 with a nominal dimension of $d_1$=5.6 mm, $d_2$=4.75 mm, $d_3$=4 mm, $d_4$=3.35 mm, $d_5$=2.36 mm, $d_6$=1.7 mm, $d_7$=1.4 mm, or $d_8$=1 mm were used. Through the sieves $d_i$, 100 g of polyamide pre-expanded particles were sieved. The average particle size D1 of all particle aggregates was calculated from the weight ratio $X_i$ of particles passed through the sieve $d_i$ but remained on the sieve $d_{i+1}$ by the following equation:

$$D1 = \Sigma X_i (d_i \cdot d_{i+1})^{1/2}$$

(where i represents an integer of 1 to 7)

(7) Measurement of average cell size D2 (mm) of closed cells in polyamide pre-expanded particle A plane in which a polyamide pre-expanded particle had been dissected at the center thereof was imaged under a scanning electron microscope. The cell area of a closed cell was calculated from the SEM image using imaging software. The imaging software used was ImageJ 1.48v (freeware, version 1.46, developed by Wayne Rasband, Jul. 10, 2014). The closed cell areas (S) of 30 closed cells were calculated, and the diameter $d=2(S/3.14)^{1/2}$ was determined for each closed cell assuming that the cell was circular. The addition average of the diameters of the 30 cells was determined as the average cell size (D2) of closed cells in the polyamide pre-expanded particle.

(8) Measurement of Maximum Endothermic Peak of Polyamide Pre-Expanded Particles Using Differential Scanning Calorimeter (DSC)

The peak temperature and width of the maximum endothermic peak of polyamide pre-expanded particles were determined using a differential scanning calorimeter (DSC) (EXSTAR DSC7020 manufactured by Hitachi High-Tech Science Corporation). Water and/or ethanol adhered to surfaces of the polyamide pre-expanded particles were removed. The polyamide pre-expanded particles were then loaded into a sealed container made of aluminum. A measurement is carried out in a nitrogen stream of 50 mL/min. Specifically, a DSC curve was obtained by heating the polyamide pre-expanded particles from 30° C. to 280° C. at 10° C./min, and measuring a change in the calorie.

In the resultant DSC curve, the temperature (° C.) at the peak top of the maximum endothermic peak where the heat absorption was maximized from the start of the measurement was determined. In addition, on the DSC curve, the width (° C.) of the maximum endothermic peak when a straight line approximating the DSC curve on the high temperature side relative to the maximum endothermic peak after an end of melting was used as the baseline was determined, wherein the width corresponded to the difference between the extrapolated melting start temperature which was the temperature at the intersection point between the tangent line at the inflection point of the maximum endothermic peak on the low temperature side and the baseline, and the extrapolated melting end temperature which was the temperature at the intersection point between the tangent line at the inflection point of the maximum endothermic peak on the high temperature side and the baseline.

[Production Example of Polyamide Pre-Expanded Particles (A-1)]

Polyamide 6/66 resin (2430A manufactured by DSM and having a surface tension of 46 mN/m at 20° C., indicated by "PA6/66" in the table) and 0.8% of talc were molten in an extruder, and strands discharged from the extrusion die were pelletized in water to obtain pellets having an average particle size of 1.4 mm. The pellets had a melting point of 193° C. The resultant pellets were loaded into a pressure vessel at 10° C. Carbon dioxide gas at 4 MPa gas was blown into the pellets, and the pellets were left stand for 12 hours so that the gas was absorbed. The pellets containing carbon dioxide gas were then transferred to a foaming apparatus, and the air at 200° C. was blown for 20 seconds to produce aggregates of polyamide expanded particles. The resultant polyamide pre-expanded particles had an expansion ratio of 4.0 times the cross-section of the solid sphere, an average particle size of 2.2 mm, an average size of closed cells of 0.15 mm, a water content ratio of 1.5%, and a surface-adhesion water ratio of 0%.

Example 1

The polyamide pre-expanded particles of Production Example (A-1) were placed in a bag of a water-permeable nonwoven fabric, immersed in a constant-temperature water bath heated to 50° C. for 30 minutes to obtain water-containing polyamide pre-expanded particles. The polyamide pre-expanded particles had a water content ratio of 12%, a surface-adhesion water ratio of 7.0%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.4 (cc/g), and a bending strength of 4.5 MPa. No defect due to insufficient loading of the expanded particles was observed in this molded article.

Example 2

The polyamide pre-expanded particles of Production Example (A-1) were placed in a bag of a water-permeable nonwoven fabric, immersed in a constant-temperature water bath heated to 50° C. for 5 minutes, and then subjected to a dehydration treatment in a dehydrator at 1000 rpm/min for 3 minutes to obtain water-containing polyamide pre-expanded particles. The polyamide pre-expanded particles had a water content ratio of 7.4%, a surface-adhesion water ratio of 7.5%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.4 (cc/g), and a bending strength of 4.5 MPa. No defect due to insufficient loading of the expanded particles was observed in this molded article.

Example 3

The polyamide pre-expanded particles of Production Example (A-1) were placed in a bag of a water-permeable nonwoven fabric, immersed in a constant-temperature water bath heated to 50° C. for 3 minutes, and then subjected to a dehydration treatment in a dehydrator at 1000 rpm/min for 3 minutes to obtain water-containing polyamide pre-expanded particles. The polyamide pre-expanded particles had a water content ratio of 6.3%, a surface-adhesion water ratio of 7.5%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.2 (cc/g), and a bending strength of 3.8 MPa. No defect due to insufficient loading of the expanded particles was observed in this molded article.

Example 4

The polyamide pre-expanded particles of Production Example (A-1) were placed in a bag of a water-permeable nonwoven fabric, immersed in a constant-temperature water bath heated to 50° C. for 1 minute, and then subjected to a dehydration treatment in a dehydrator at 1000 rpm/min for 3 minutes to obtain water-containing polyamide expanded particles. The polyamide expanded particles had a water content ratio of 4.5%, a surface-adhesion water ratio of 5.2%, an average particle size (D1) of 2.2 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide expanded particles were molded into a molded article by supplying saturated steam at 105° C. into the cavity for 10 seconds, and subsequently supplying saturated steam at 116° C. into the cavity for 30 seconds to cause foaming and thermal fusion of the expanded particles. Cooling water was supplied into the cavity of the mold to cool the resultant molded article. Thereafter, the mold was opened and the polyamide foam molded article was removed. This polyamide foam molded article after being dried had a specific volume of 5.0 (cc/g), and a bending strength of 3.5 MPa. No defect due to insufficient loading of the expanded particles was observed in this molded article.

Example 5

The polyamide pre-expanded particles of Production Example (A-1) was stored in a constant temperature and humidity chamber at 23° C. and 55% for 48 hours or more. The water content ratio was then measured and determined to be 3.5%. The surface-adhesion water ratio was 0%, the average particle size (D1) was 2.2 mm, and the average size (D2) of closed cells was 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 4.8 (cc/g), and a bending strength of 3.0 MPa. No defect due to insufficient loading of the expanded particles for the molded article was observed in this molded article.

Example 6

The polyamide pre-expanded particles of Production Example (A-1) was stored in a constant temperature and humidity chamber at 23° C. and 55% for 12 hours. The water content ratio was then measured and determined to be 3.0%. The surface-adhesion water ratio was 0%, the average particle size (D1) was 2.2 mm, and the average size (D2) of closed cells was 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article.

Thereafter, the mold was opened and the polyamide foam molded article was removed. This polyamide foam molded article after being dried had a specific volume of 4.8 (cc/g), and a bending strength of 2.8 MPa. No defect due to insufficient loading of the expanded particles was observed in this molded article.

Example 7

The polyamide pre-expanded particles of Production Example (A-1) were placed in a bag of a water-permeable nonwoven fabric, immersed in a constant-temperature water bath heated to 50° C. for 5 minutes to obtain water-containing polyamide pre-expanded particles. The polyamide pre-expanded particles had a water content ratio of 7.5%, a surface-adhesion water ratio of 15%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.5 (cc/g), and a bending strength of 4.3 MPa. A number of defects due to insufficient loading of the expanded particles were observed in this molded article.

Example 8

The polyamide pre-expanded particles of Production Example (A-1) were placed in a bag of a water-permeable nonwoven fabric, immersed in a constant-temperature water bath heated to 50° C. for 5 minutes, and then subjected to a dehydration treatment in a dehydrator at 1000 rpm/min for 1 minute to obtain water-containing polyamide pre-expanded particles. The polyamide pre-expanded particles had a water content ratio of 7.5%, a surface-adhesion water ratio of 11%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.4 (cc/g), and a bending strength of 4.3 MPa. A small number of defects due to insufficient loading of the expanded particles were observed in this molded article.

Example 9

[Production Example of polyamide pre-expanded particles (A-2)] Polyamide 6/66 resin (2430A manufactured by DSM and having a surface tension of 46 mN/m at 20° C., indicated by "PA6/66" in the table) and 0.5% of talc were molten in an extruder, and strands discharged from the extrusion die were pelletized in water to obtain pellets having an average particle size of 1.4 mm. The pellets had a melting point of 193° C. The resultant pellets were loaded into a pressure vessel at 10° C. Carbon dioxide gas at 4 MPa gas was blown into the pellets, and the pellets were left stand for 12 hours so that the gas was absorbed. The pellets containing carbon dioxide gas were then transferred to a foaming apparatus, and the air at 200° C. was blown for 20 seconds to produce aggregates of polyamide expanded particles. The resultant polyamide pre-expanded particles had an expansion ratio of 3.5 times the cross-section of the solid sphere, an average particle size of 2.0 mm, an average size of closed cells of 0.25 mm, a water content ratio of 1.5%, and a surface-adhesion water ratio of 0%.

The polyamide pre-expanded particles of Production Example (A-2) were placed in a bag of a water-permeable nonwoven fabric, immersed in a constant-temperature water bath heated to 50° C. for 5 minutes, and then subjected to a dehydration treatment in a dehydrator at 1000 rpm/min for 3 minutes to obtain water-containing polyamide pre-expanded particles. The polyamide expanded particles had a water content ratio of 7.7%, a surface-adhesion water ratio of 7.0%, an average particle size (D1) of 2.1 mm, and an average size (D2) of closed cells of 0.25 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article.

Thereafter, the mold was opened and the polyamide foam molded article was removed. This polyamide foam molded article after being dried had a specific volume of 4.8 (cc/g), and a bending strength of 3.3 MPa. No defect due to insufficient loading of the expanded particles was observed in this molded article.

Example 10

[Production Example of Polyamide Pre-Expanded Particles (A-3)]
Polyamide 6/66 resin (2430A manufactured by DSM and having a surface tension of 46 mN/m at 20° C., indicated by "PA6/66" in the table) and 0.1% of talc were molten in an extruder, and strands discharged from the extrusion die were pelletized in water to obtain pellets having an average particle size of 1.4 mm. The pellets had a melting point of 193° C. The resultant pellets were loaded into a pressure vessel at 10° C. Carbon dioxide gas at 4 MPa gas was blown into the pellets, and the pellets were left stand for 12 hours so that the gas was absorbed. The pellets containing carbon dioxide gas were then transferred to a foaming apparatus, and the air at 200° C. was blown for 20 seconds to produce aggregates of polyamide expanded particles. The resultant polyamide pre-expanded particles had an expansion ratio of 3.5 times the cross-section of the solid sphere, an average particle size of 2.0 mm, an average size of closed cells of 0.4 mm, a water content ratio of 1.5%, and a surface-adhesion water ratio of 0%.

The polyamide pre-expanded particles of Production Example (A-3) were placed in a bag of a water-permeable nonwoven fabric, immersed in a constant-temperature water bath heated to 50° C. for 5 minutes, and then subjected to a dehydration treatment in a dehydrator at 1000 rpm/min for 3 minutes to obtain water-containing polyamide pre-expanded particles. The expanded particles had a water content ratio of 7.5%, a surface-adhesion water ratio of 7.4%, an average particle size (D1) of 2.1 mm, and an average size (D2) of closed cells of 0.4 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 4.5 (cc/g), and a bending strength of 3.0 MPa. No defect due to insufficient loading of the expanded particles was observed in this molded article.

Example 11

[Production Example of polyamide pre-expanded particles (A-4)] Polyamide 6/66 resin (2430A manufactured by DSM and having a surface tension of 46 mN/m at 20° C., indicated by "PA6/66" in the table) and 0.8% of talc were molten in an extruder, and strands discharged from the profile extrusion die were pelletized in water to obtain pellets having an average particle size of 1.4 mm. The pellets had a melting point of 193° C. The resultant pellets were loaded into a pressure vessel at 10° C. Carbon dioxide gas at 4 MPa gas was blown into the pellets, and the pellets were left stand for 12 hours so that the gas was absorbed. The pellets containing carbon dioxide gas were then transferred to a foaming apparatus, and the air at 200° C. was blown for 20 seconds to produce aggregates of polyamide expanded particles. The resultant polyamide pre-expanded particles had an expansion ratio of 3.8 times the cross-sectional shape illustrated in FIG. 1 (c), an average particle size of 2.2 mm, an average size of closed cells of 0.18 mm, a water content ratio of 1.5%, and a surface-adhesion water ratio of 0%.

The polyamide pre-expanded particles of Production Example (A-4) were placed in a bag of a water-permeable nonwoven fabric, immersed in a constant-temperature water bath heated to 50° C. for 5 minutes, and then subjected to a dehydration treatment in a dehydrator at 1000 rpm/min for 3 minutes to obtain water-containing polyamide expanded particles. The polyamide pre-expanded particles had a water content ratio of 9.5%, a surface-adhesion water ratio of 9.0%, an average particle size (D1) of 2.3 mm, and an average size (D2) of closed cells of 0.18 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.2 (cc/g), and a bending strength of 3.8 MPa. No defect due to insufficient loading of the expanded particles was observed in this molded article.

Example 12

The polyamide pre-expanded particles of Production Example (A-1) were placed in a bag of a water-permeable nonwoven fabric, immersed in ethanol heated to 30° C. for 240 minutes to obtain polyamide pre-expanded particles immersed in ethanol. Ethanol on the surfaces of the polyamide pre-expanded particles was removed with a nonwoven fabric. The ethanol content ratio of the polyamide pre-expanded particles was 9.5%. Further, the average particle size (D1) was 2.2 mm, and the average size (D2) of closed cells was 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.0 (cc/g), and a bending strength of 3.0 MPa. No defect due to insufficient loading of the expanded particles was observed in this molded article.

Example 13

The polyamide pre-expanded particles of Production Example (A-1) were placed in a bag of a water-permeable nonwoven fabric, and immersed in a mixed solvent having a ratio of ethanol and water of 50:50 heated to 30° C. for 240 minutes to obtain polyamide pre-expanded particles. Water and ethanol on the surfaces of the polyamide pre-expanded particles were removed by a nonwoven fabric, and then the water and ethanol content ratios were quantified by GC-MS. The ethanol content ratio and the water content ratio of the polyamide pre-expanded particles were 6% and 7%, respectively. Further, the average particle size (D1) was 2.2 mm, and the average size (D2) of closed cells was 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.2 (cc/g), and a bending strength of 4.3 MPa. No defect due to insufficient loading of the expanded particles was observed in this molded article.

Example 14

[Production Example of polyamide pre-expanded particles (A-5)] Polyamide 6 resin (1022B manufactured by Ube Industries, Ltd. and having a surface tension of 46 mN/m at 20° C., indicated by "PA6" in the table) and 0.8% of talc were molten in an extruder, and strands discharged from the extrusion die were pelletized in water to obtain pellets having an average particle size of 1.4 mm. The pellets had a melting point of 224° C. The resultant pellets were loaded into a pressure vessel at 10° C. Carbon dioxide gas at 4 MPa gas was blown into the pellets, and the pellets were left stand for 12 hours so that the gas was absorbed. The pellets containing carbon dioxide gas were then transferred to a foaming apparatus, and the air at 240° C. was blown for 20 seconds to produce aggregates of polyamide expanded particles. The resultant polyamide pre-expanded particles had an expansion ratio of 2.9 times the cross-section of the solid sphere, an average particle size of 2.0 mm, an average size of closed cells of 0.10 mm, a water content ratio of 1.5%, and a surface-adhesion water ratio of 0%.

The polyamide pre-expanded particles of Production Example (A-5) were placed in a bag of a water-permeable nonwoven fabric, immersed in a constant-temperature water bath heated to 50° C. for 5 minutes, and then subjected to a dehydration treatment in a dehydrator at 1000 rpm/min for 3 minutes to obtain water-containing polyamide expanded particles. The polyamide pre-expanded particles had a water content ratio of 11.0%, a surface-adhesion water ratio of 7.0%, an average particle size (D1) of 2.0 mm, and an average size (D2) of closed cells of 0.10 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 140° C. into the cavity for 10 seconds, and subsequently supplying saturated steam at 150° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 4.1 (cc/g), and a bending strength of 2.8 MPa. No defect due to insufficient loading of the expanded particles was observed in this molded article.

Comparative Example 1

The polyamide pre-expanded particles of Production Example (A-1) were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours. The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 4.8 (cc/g), and a bending strength of 2.5 MPa. No defect due to insufficient loading of the expanded particles was observed in this molded article.

Comparative Example 2

The polyamide pre-expanded particles of Production Example (A-1) were placed in a bag of a water-permeable nonwoven fabric, immersed in a constant-temperature water bath heated to 50° C. for 60 minutes, and then subjected to a dehydration treatment in a dehydrator at 1000 rpm/min for 3 minutes to obtain water-containing polyamide pre-expanded particles. The expanded particles had a water content ratio of 15.4%, a surface-adhesion water ratio of 7.5%, an average particle size (D1) of 2.3 mm, and an average size (D2) of closed cells of 0.15 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 105° C. into the cavity for 10 seconds, and subsequently supplying saturated steam at 116° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 5.4 (cc/g), and a bending strength of 2.7 MPa. A number of defects due to insufficient loading of the expanded particles were observed in this molded article.

Comparative Example 3

The polyamide pre-expanded particles of Production Example (A-5) was stored in a constant temperature and humidity chamber at 23° C. and 55% for 48 hours or more. The water content ratio was then measured and determined to be 3.5%. The surface-adhesion water ratio was 0%, the average particle size (D1) was 2.0 mm, and the average size (D2) of closed cells was 0.10 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 140° C. into the cavity for 10 seconds, and subsequently supplying saturated steam at 150° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 3.8 (cc/g), and a bending strength of 0.5 MPa. No defect due to insufficient loading of the expanded particles was observed in this molded article.

Example 15

The polyamide pre-expanded particles of Production Example (A-5) was stored in a constant temperature and humidity chamber at 23° C. and 55% for 48 hours or more. The water content ratio was then measured and determined to be 3.5%. The surface-adhesion water ratio was 0%, the average particle size (D1) was 2.0 mm, and the average size (D2) of closed cells was 0.10 mm.

The resultant polyamide pre-expanded particles were pressure treated by sealing the polyamide pre-expanded particles in an autoclave, introducing compressed air into the autoclave over 1 hour until the pressure inside the autoclave reached 0.4 MPa, and then maintaining the pressure at 0.4 MPa for 24 hours.

The polyamide pre-expanded particles subjected to pressure treatment were loaded into the cavity (cavity dimensions: 300 mm in length, 300 mm in width, 25 mm in height) of a mold for in-mold molding and the mold was clamped. The mold was installed in an in-mold foam molding machine.

Thereafter, the polyamide pre-expanded particles were molded into a molded article by supplying saturated steam at 140° C. into the cavity for 45 seconds, and subsequently supplying saturated steam at 150° C. into the cavity for 30 seconds to cause foaming and thermal fusion of the pre-expanded particles. Cooling water was supplied into the cavity of the mold to cool the resultant molded article. Thereafter, the mold was opened and the polyamide foam molded article was removed. This polyamide foam molded article after being dried had a specific volume of 3.8 (cc/g), a bending strength of 2.8 MPa, and a fusion rate of 90%. No defect due to insufficient loading of the expanded particles was observed in this molded article.

Further, after saturated steam at 140° C. was supplied into the cavity for 45 seconds, the molding was stopped. The polyamide expanded particles caused to absorb water in the mold were taken out and water adhered to the surfaces was removed. The water content ratio was measured and determined to be 7.5%. Further, a DSC measurement was carried out. The peak temperature of the maximum endothermic peak was 195° C. and the width of the maximum endothermic peak was 32° C.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polyamide pre-expanded particles | Production Example | A-1 | A-1 | A-1 | A-1 | A-1 | A-1 | A-1 | A-1 | A-2 | A-3 |
| | Polyamide resin | PA6/66 | PA6/66 | PA6/66 | PA6/66 | PA6/66 | PA6/66 | PA6/66 | PA6/66 | PA6/66 | PA6/66 |
| | Shape | spheric | spheric | spheric | spheric | spheric | spheric | spheric | spheric | spheric | spheric |
| | Water content ratio (%) | 12 | 7.4 | 6.3 | 4.5 | 3.5 | 3.0 | 7.5 | 7.5 | 7.7 | 7.5 |
| | Surface-adhesion water ratio (%) | 7 | 7.5 | 7.5 | 5.2 | 0.0 | 0.0 | 15 | 11 | 7 | 7.4 |
| | Average particle size D1 (mm) | 2.3 | 2.3 | 2.3 | 2.2 | 2.2 | 2.2 | 2.3 | 2.3 | 2.1 | 2.1 |
| | Average cell size D2 (mm) of closed cells | 0.15 | 0.15 | 0.15 | 0.15 | 0.15 | 0.15 | 0.15 | 0.15 | 0.25 | 0.40 |
| | D1/D2 | 15.3 | 15.3 | 15.3 | 14.7 | 14.7 | 14.7 | 15.3 | 15.3 | 8.4 | 5.25 |
| | Temperature of maximum endothermic peak (° C.) | 164 | 172 | 175 | 180 | 184 | 185 | 172 | 171 | 172 | 171 |
| | Width of maximum endothermic peak (° C.) | 65 | 44 | 42 | 38 | 35 | 33 | 44 | 44 | 47 | 44 |
| Polyamide foam molded article | Specific volume (cc/g) | 5.4 | 5.4 | 5.2 | 5.0 | 4.8 | 4.8 | 5.5 | 5.4 | 4.8 | 4.5 |
| | Bending strength (MPa) | 4.5 | 4.5 | 3.8 | 3.5 | 3.0 | 2.8 | 4.3 | 4.3 | 3.3 | 3.0 |
| | Fusion rate (%) | 100 | 100 | 100 | 100 | 95 | 93 | 95 | 95 | 95 | 93 |
| | Defect due to insufficient loading | Absent | Absent | Absent | Absent | Absent | Absent | Present | Slight | Absent | Absent |

| | | Example 11 | Example 12 | Example 13 | Example 14 | Comp. Ex. 1 | Comp. Ex. 2 | Comp. Ex. 3 |
|---|---|---|---|---|---|---|---|---|
| Polyamide pre-expanded particles | Production Example | A-4 | A-1 | A-1 | A-5 | A-1 | A-1 | A-5 |
| | Polyamide resin | PA6/66 | PA6/66 | PA6/66 | PA6 | PA6/66 | PA6/66 | PA6 |
| | Shape | O shaped | spheric | spheric | spheric | spheric | spheric | spheric |
| | Water content ratio (%) | 9.5 | EtOH 9.5 | EtOH 6 water 7 | 11.0 | 1.5 | 15.4 | 3.5 |
| | Surface-adhesion water ratio (%) | 9 | 0 | 0 | 7.0 | 0 | 7.5 | 0 |
| | Average particle size D1 (mm) | 2.3 | 2.2 | 2.2 | 2.0 | 2.2 | 2.3 | 2.0 |
| | Average cell size D2 (mm) of closed cells | 0.18 | 0.15 | 0.15 | 0.10 | 0.15 | 0.15 | 0.10 |
| | D1/D2 | 12.8 | 14.7 | 14.7 | 20 | 14.7 | 15.3 | 20 |
| | Temperature of maximum endothermic peak (° C.) | 168 | 170 | 175 | 189 | 188 | 145 | 210 |
| | Width of maximum endothermic peak (° C.) | 45 | 59 | 58 | 33 | 25 | 78 | 25 |
| Polyamide foam molded article | Specific volume (cc/g) | 5.2 | 5.0 | 5.2 | 4.1 | 4.8 | 5.4 | 3.8 |
| | Bending strength (MPa) | 3.8 | 3.0 | 4.3 | 2.8 | 2.5 | 2.7 | 0.5 |

TABLE 1-continued

| | | | | | | | |
|---|---|---|---|---|---|---|---|
| Fusion rate (%) | 95 | 93 | 93 | 90 | 93 | 93 | 80 |
| Defect due to insufficient loading | Absent | Absent | Absent | Absent | Absent | Present | Absent |

INDUSTRIAL APPLICABILITY

According to the present disclosure, a polyamide foam molded article having an excellent mechanical strength can be provided through in-mold foam molding of polyamide pre-expanded particles which exhibit a certain maximum endothermic peak on a DSC curve. In particular, a polyamide foam molded article having an excellent mechanical strength can be provided through in-mold foam molding of polyamide pre-expanded particles having an adjusted water content ratio.

The disclosed polyamide foam molded article can be suitably adopted for an insulting material, automotive component (for example, an oil pan, a cover-shaped component such as an engine cover or cylinder head cover, an intake manifold, an integrated component thereof, a body structure, a duct, an electrical equipment case, or a battery case), or the like used under high-temperature conditions, such as to exploit the features of the disclosed polyamide foam molded article. Examples of the application of foam molded article having communicating pores produced from polyamide foam particles of the present disclosure having the particular structure include members used for reducing driving noises such as noises of vehicles e.g., automobiles, electric trains, steam trains, and aircrafts in which lightweightness and noise reduction are demanded. In particular, the foam molded article can be particularly suitable for applications of sound absorption and insulation members such as an automobile engine cover, an engine capsule, an engine room hood, a transmission casing, a sound absorbing cover, a casing of a motor for an electric vehicle, and a sound absorbing cover.

REFERENCE SIGNS LIST

A Intersection point between DSC curve on low temperature side and baseline
B Intersection point between DSC curve on high temperature side and baseline
C Intersection point between tangent line at inflection point on low temperature side relative to maximum endothermic peak and baseline
D Intersection point between tangent line at inflection point on high temperature side relative to maximum endothermic peak and baseline
$C_T$ Extrapolated melting start temperature
$D_T$ Extrapolated melting end temperature
$P_T$ Peak temperature of maximum endothermic peak

The invention claimed is:

1. Polyamide pre-expanded particles,
having a peak temperature of a maximum endothermic peak of 150° C. or higher and 275° C. or lower on a DSC curve obtained while being heated from 30° C. to 280° C. under a condition of a heating rate of 10° C./min using a differential scanning calorimeter,
wherein a width of the maximum endothermic peak is 30° C. or greater and 80° C. or smaller when a straight line approximating the DSC curve on a high temperature side relative to the maximum endothermic peak after an end of melting is used as a baseline, the width corresponding to a difference between an extrapolated melting start temperature which is a temperature at an intersection point between a tangent line at an inflection point of the maximum endothermic peak on a low temperature side and the baseline, and an extrapolated melting end temperature which is a temperature at an intersection point between a tangent line at an inflection point of the maximum endothermic peak on a high temperature side and the baseline.

2. The polyamide pre-expanded particles according to claim 1, wherein the particles contain water in a ratio of 4.5 mass % or more and 15 mass % or less.

3. The polyamide pre-expanded particles according to claim 1, wherein a ratio D1/D2 of an average particle size (D1) and an average cell size (D2) of closed cells is 6.0 or more.

4. The polyamide pre-expanded particles according to claim 1, wherein the polyamide is polyamide 6/66.

5. The polyamide pre-expanded particles according to claim 1, wherein the particles have a hollow portion or a recessed external shape.

6. The polyamide pre-expanded particles according to claim 1, wherein a surface-adhesion water ratio is 14% or less.

7. The polyamide pre-expanded particles according to claim 1, wherein the surface-adhesion water ratio is smaller than a water content ratio inside the particles.

8. A polyamide foam molded article comprising:
polyamide pre-expanded particles according to claim 1 which are fused together.

9. A method of producing a polyamide foam molded article comprising:
thermally fusing polyamide pre-expanded particles according to claim 1.

10. A method of producing a polyamide foam molded article comprising:
performing a moisturizing treatment to cause the polyamide pre-expanded particles according to claim 1 to contain water in a ratio of 3 mass % or more and 15 mass % or less; and
then thermally fusing the polyamide pre-expanded particles.

11. The method of producing a polyamide foam molded article according to claim 10, wherein the moisturizing treatment comprises immersing the polyamide pre-expanded particles in hot water at 40° C. or higher.

12. The method of producing a polyamide foam molded article according to claim 10, wherein time of the moisturizing treatment is 30 minutes or less.

13. The method of producing a polyamide foam molded article according to claim 10, further comprising a step of removing water adhered to surfaces so that a surface-adhesion water ratio is 14% or less after performing the moisturizing treatment on the polyamide pre-expanded particles.

14. The method of producing a polyamide foam molded article according to claim 13, further comprising a step of removing the water adhered to the surfaces so that the surface-adhesion water ratio is smaller than a water content ratio after performing the moisturizing treatment on the polyamide pre-expanded particles.

15. A method of producing a polyamide foam molded article comprising:
- loading the polyamide pre-expanded particles according to claim 1 into a mold;
- heating the polyamide pre-expanded particles with saturated steam at a temperature equal to or lower than a molding temperature minus 5° C. for 1 second or more and 10 seconds or less, the molding temperature being 100° C. or higher; and
- then thermally fusing the polyamide pre-expanded particles with saturated steam at the molding temperature.

* * * * *